Patented Dec. 7, 1926.

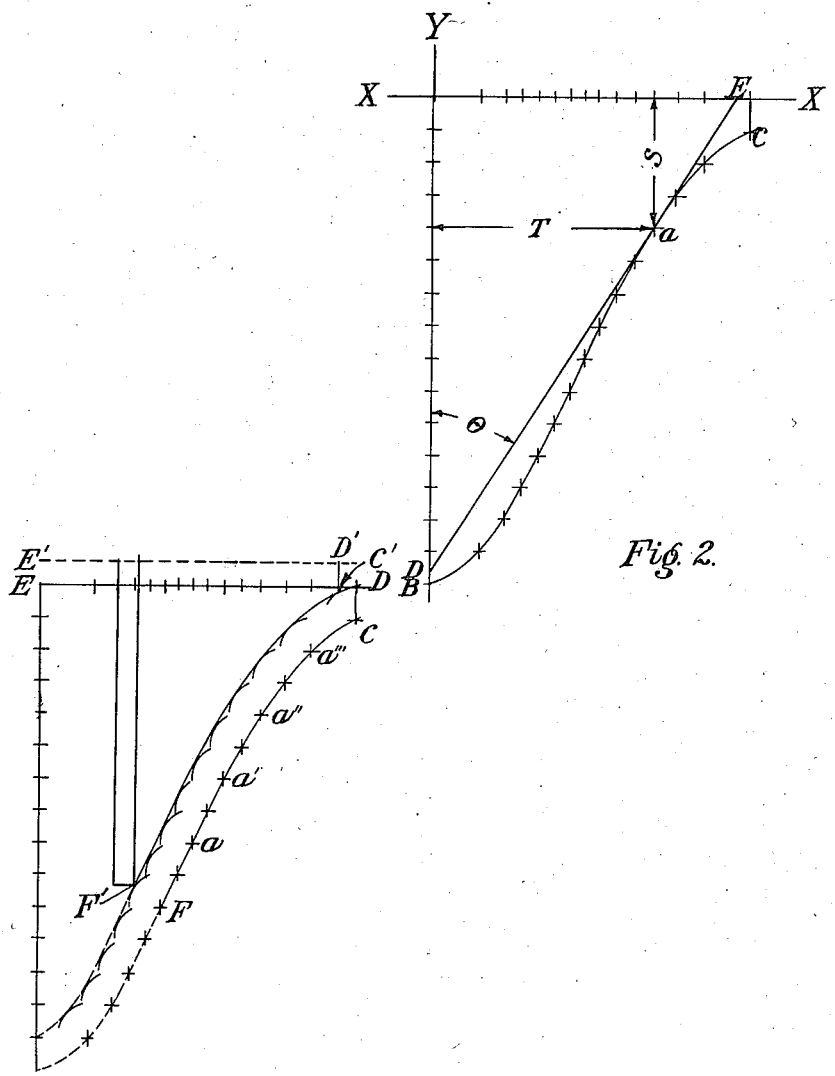

1,609,439

UNITED STATES PATENT OFFICE.

LEON B. STRONG, OF DENVER, COLORADO.

AUTOMATIC LOAD-REGULATING TRANSMISSION MECHANISM.

Application filed September 1, 1922. Serial No. 585,688.

This invention relates to a transmission mechanism and has for a primary object to provide a mechanism, the parts of which are so constructed and arranged that a change in the resistance imposed upon a driven machine automatically produces a change in mechanical advantage such that the load upon the prime mover will not be materially affected thereby. A further object of the invention is to provide an integral frame, in a device of this character, so arranged that the bearings therein will be held in alignment and in proper relation to each other.

Figure 1:
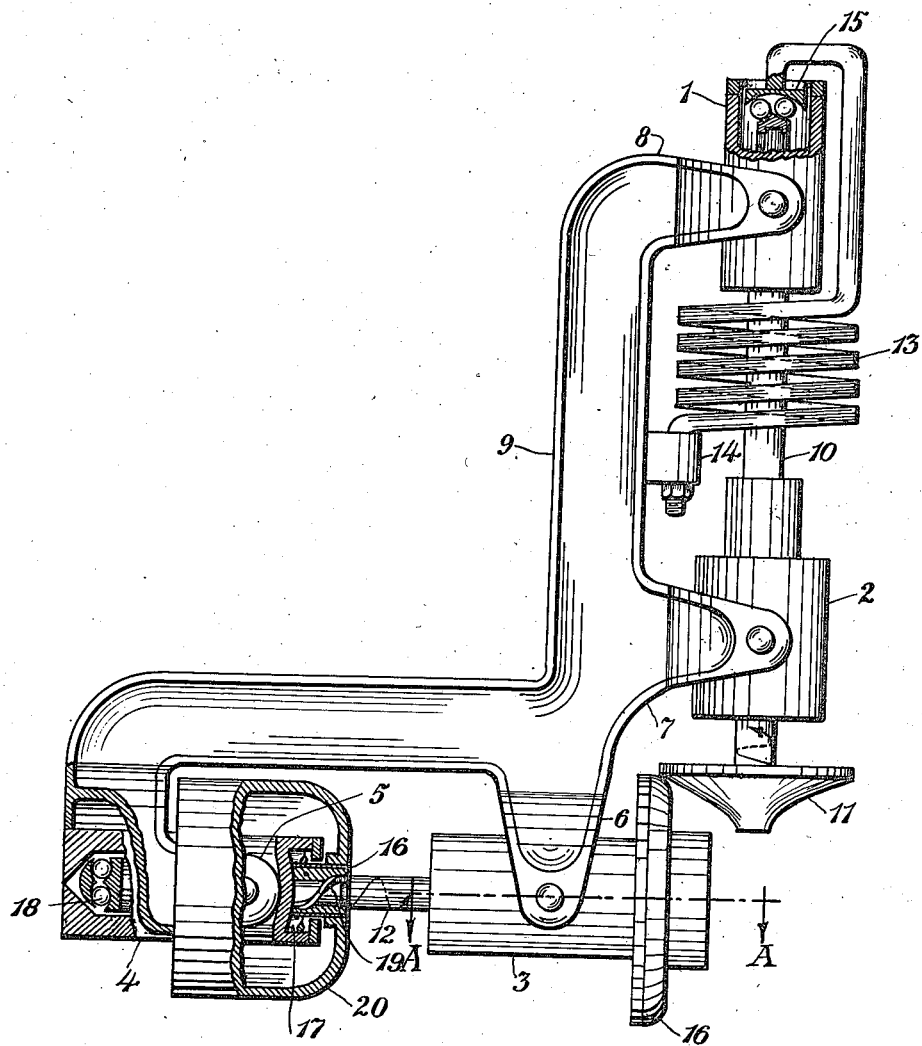
Figure 4:
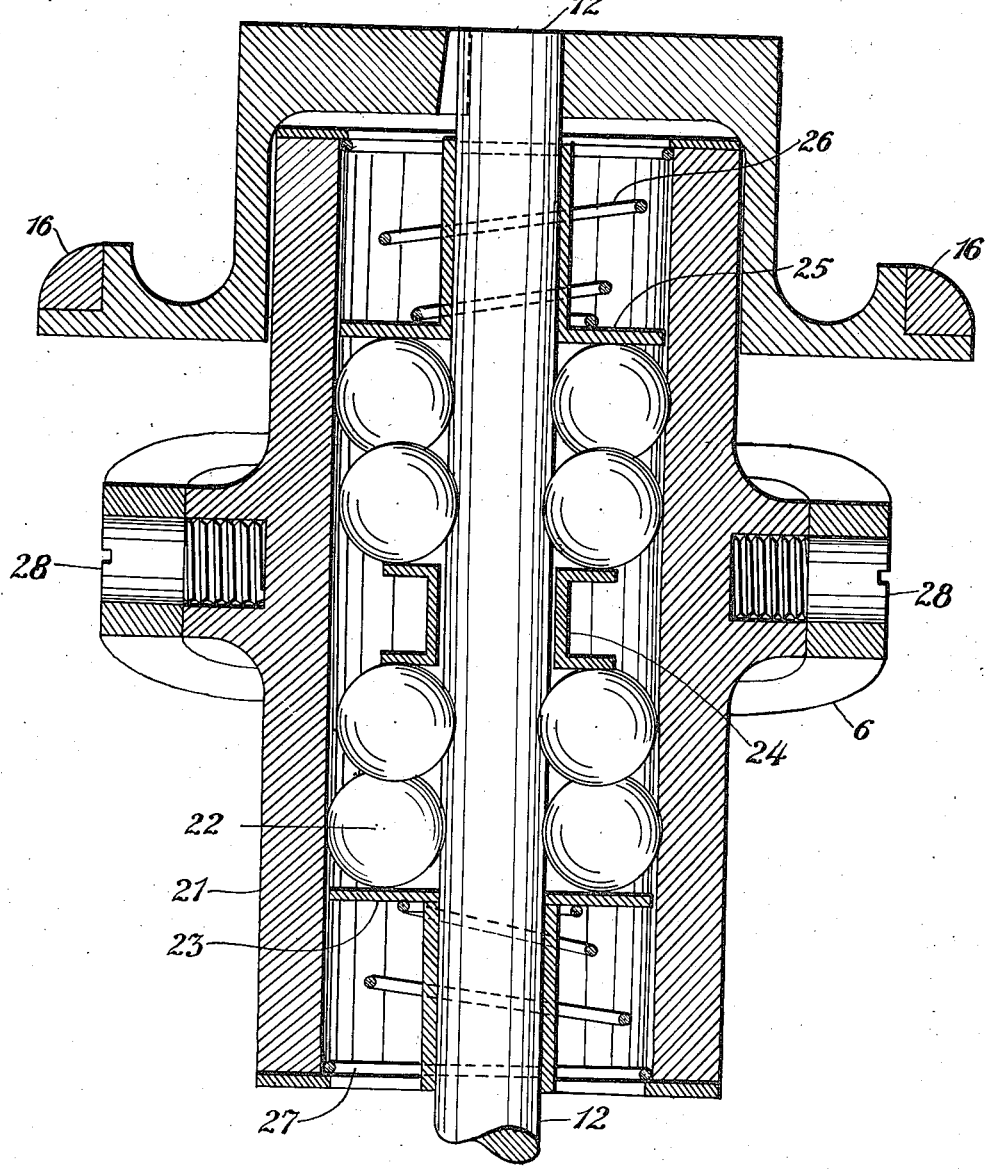

With this object in view, the invention will be better understood from the following detailed description taken in connection with the accompanying drawings, wherein:

Figure 1 is a top plan view of the mechanism;

Figures 2 and 3, the construction of the curve constituting the generatrix of cone 11;

Figure 4 is a section on the line A—A.

Again referring to the drawing illustrating one manner in which the invention may be constructed, the numeral 10 designates a drive shaft, mounted for longitudinal as well as rotary motion in bearings 1 and 2, having one end fitted with a cone 11 and variably forced toward the driven shaft 12 by a spring 13, having one end secured to a lug 14 of main casting 9 and its free end forcing said drive shaft in said mentioned direction through end thrust bearing 15.

Bearings 1, 2, 3 and 4 are pivotally mounted between forked projections 5, 6, 7 and 8, respectively, to insure even distribution of working pressure on said bearings.

Arranged in engagement with a point on the surface of the cone 11 is a circular ring 16 whose cross-section is substantially a right angle subtended by a circular arc, said circular arc forming the exterior portion of said ring. Thus, it will be seen, that as a point only of the surface of the cone is engaged at any one time, the tendency to excessive wear and loss of power is eliminated by causing a rolling drive effect.

Pivotally arranged between forked projection 5 of casting 9 is a housing 4, rotatably holding sleeve 16 in one position relative to the stationary members by radial roller bearing 17 and end thrust bearing 18.

Mounted upon sleeve 16 is a pulley 20 connecting the driven machine with driven shaft 12 by means of a belt carried thereon and spiral thread 19.

It should now be clear to one skilled in the art, that with shaft 12 turning in the direction indicated by the arrow, same will be forced to the right in direct proportion to torsion load on driven pulley 20. It should also be clear that the end thrust thus generated will be transmitted from bearing 18 to spring 13, through longitudinally adjustable shaft 12, ring 16, cone 11, shaft 10 and bearing 15 and that said spring will be deflected proportionately to the component of force in the direction of its length, thereby automatically varying the effective radius of the cone.

Figure 4 is designed to show, in a general way, the interior construction of radial bearings 1, 2 and 3, also to show more clearly the construction of ring 16 and the means for holding same concentric with, and in one position relative to driven shaft 12.

Surrounding shaft 12 is a hollow cylinder 21, pivotally mounted between forked projection 6 of main casting 9. Arranged between shaft 12 and the internal cylinder surface of cylinder 21 are steel balls 22 of such a size as to hold shaft 12 concentric with cylinder 21. Loosely mounted upon shaft 12 are flanged cylinders 23, 24 and 25, so positioned as to yieldably hold the balls in a predetermined position by means of springs 26 and 27. Thus it will be seen that, as longitudinal movement of shaft 12 takes place, the balls roll rather than slip in accordance with this movement, and are gently forced back to a predetermined position when longitudinal movement of shaft 12 ceases. Pivot 28 is so positioned that when the load upon shaft 12 reaches a maximum, the clockwise and counterclockwise moments of force acting on shaft 12 about that pivot balance, thereby relieving the spirally threaded portion of shaft 2 of radial strain.

Let us now consider the derivation of a formula whereby we can determine the amount of the torsion load P in pound feet upon shaft 1 in terms of known quantities.

T the thrust of spring 13 in pounds,
S the effective radius of cone 11 in inches,
Θ the angle between a line tangent to the curved contour of the cone at the point of contact and a line perpendicular to the axis of the cone, R the effective radius of ring 16 in inches, and L the lead of spiral thread 19 in inches per revolution.

Let F equal force acting tangentially to ring 16 and cone 11.

Since thrust upon shaft 12 toward the right due to torque on the feed screw is, $$\frac{2\pi RF}{L},$$

and, equal and opposite thrust due to the spring is, T tan θ, then $$\frac{2\pi RF}{L} = T \tan \theta,$$

or $$F = \frac{LT \tan \theta}{2\pi R},$$

since $$P = \frac{FS}{12},$$

then, substituting, $$P = \frac{LTS \tan \theta}{24\pi R}.$$

Obviously, the curve forming the generatrix of cone 11 must be such that the result obtained by use of this equation is the same, regardless of the point of engagement.

Assuming the curve BC, Fig. 2, to be so proportioned that for any line, as the line DE, drawn tangent to the curve at any point upon it, as the point $a$, the product TS tan θ is constant, then the spring thrust component in a direction perpendicular to the axis of the cone will vary in inverse proportion to S, and the mechanical work done in moving the driven shaft longitudinally, like the work of isothermal compression of a gas, will be proportional to log. $P_2/P_1$, where $P_1$ is the initial pressure and $P_2$ the final pressure, for the variation in pressure is then identical.

Defining $a$ as the distance from the X axis at which work of deflection of the spring is begun, and placing $P_1$ equal to unity at this distance, the expression log. $P_2/P_1$ may also be written simply log. $P_2$.

$P_2$ at any lesser distance Y or S becomes $a/y$ and the expression log. $P_2$ becomes log. $a/y$ or log. $a$—log. $y$, and the mechanical work done in moving the driven shaft a distance $a$—$y$ and stored in the spring as potential energy is then proportional to log. $a$—log. $y$.

Since the thrust of a spring is proportional to its deflection it follows that its stored potential energy varies directly as the square of its deflection, and that an amount of work proportional to log. $a$—log. $y$ expended in deflecting said spring will produce a deflection proportional to $$\sqrt{\log. a - \log. y}.$$

We then have the sought for defining equation of the required curve namely $$X = C\sqrt{\log. a - \log. y}.$$

It is not found practical, however, to make the cross sectional radius of ring 16 sufficiently small that the variation of the effective radius of said ring may be neglected, for this external radius must be sufficiently large that the material of which the ring is made will not be permanently depressed by the tractive force. This variation of the effective radius of the ring can be practically compensated for as follows:

As in Figure 3, plot points F, $a$, $a'$, $a''$, $a'''$ C. Taking a radius equal to the external radius of ring 16 and with centers upon the points plotted, strike off arcs as shown, and draw the curve F'C' tangent to these arcs. From C', the point of tangency between the curve F'C' with the arc whose center is at C, lay off C'D' parallel and equal to CD. Draw E'D' and let this be the new axis of the cone. Since F'C' is, by construction, parallel to FC, it should be clear that for any given position of ring 16 with respect to the axis ED the angle θ and the spring deflection will not be affected by the considerable external radius of ring 16. Since, by construction, C'D' is equal to CD, the effective radius of the cone at this point will be the same as in Figure 2, but, as the spring 13 contracts with a decreased stress due to a lightened load upon pulley 20, this effective radius will increase more rapidly than with the construction of Figure 2. If the maximum and minimum mechanical advantage is now determined, an amount to add to the spring deflection can be found by a simple calculation that will make the torsion load upon shaft 1 with engagement at F' equal to the load with engagement at C'. It will then be found that for intermediate points, the torsion load upon shaft 1 will not vary greatly.

It is of course to be understood that the parts of the invention may be constructed in other manners and associated in other relations, therefore, I do not wish to be limited in any manner except as set forth in the claims hereunto appended.

What I claim is:

1. A transmission mechanism of the class described comprising a cone and a disc, said disc contacting at its periphery with said cone, said cone having the contour defined by the equation $$x = c\sqrt{\log. a - \log. y}$$

and an axis of rotation parallel to the axis $x$.

2. A cone for transmission mechanisms of the class described having a generatrix based on the formula $$x = c\sqrt{\log. a - \log. y}$$

and an axis of rotation parallel to the $x$ axis.

3. The combination in a transmission mechanism comprising a driving shaft and a driven shaft mounted at an angle to each other and both movable longitudinally; load actuated means for moving said shafts longitudinally, a disc actuated by one of said shafts, said disk carrying a detachable peripheral ring, and a cone carried by the other of said shafts and having its surface in contact with said ring, said cone having a contour defined by the equation $$X = c\sqrt{\log. a - \log. y}$$

and an axis of rotation parallel to the $x$ axis.

4. The combination in a transmission mechanism comprising a drive shaft and a driven shaft mounted at an angle to each other, said shafts being simultaneously movable longitudinally; load actuated means for moving said shaft longitudinally; a disk carried by one of said shafts; a cone contacting with said disc and carried by the other of said shafts and bearings for said shafts, of an integral frame supporting all of said bearings, each of said bearings being pivoted in said frame for revolution in the same plane with each other.

5. A transmission mechanism of the class described comprising a cone and a wheel, said wheel contacting at its periphery with said cone, in which the contacting surface of the cone has a contour parallel to the curve defined by the equation $$x = c\sqrt{\log. a - \log. y}$$

and an axis of rotation parallel to the $x$ axis.

6. A cone for transmission mechanism of the class described, the contour of the contacting surface of which is parallel to the curve defined by the equation $$x = c\sqrt{\log. a - \log. y}$$

and an axis of rotation parallel to the $x$ axis.

7. The combination in a transmission mechanism, comprising a driving and a driven shaft mounted at an angle to each other and both movable longitudinally; load actuated means for moving said shafts longitudinally, a ring concentric with and fixed in one position relative to said driven shaft, said ring being separable from its support, and a cone carried by the other of said shafts and having its surface in contact with said ring, said cone having its contacting contour parallel to the curve defined by the equation $$x = c\sqrt{\log. a - \log. y}$$

and an axis of rotation parallel to the $x$ axis.

8. The combination, in a transmission mechanism, of a drive shaft; a driven shaft mounted at an angle thereto, said shafts being simultaneously movable; load actuated means for moving said shafts longitudinally; a ring fixed in one position relative to, and concentric with, one of said shafts; a cone contacting with said ring and carried on the other of said shafts; bearings for both said shafts and an integral frame supporting all of said bearings, each of said bearings being pivoted for revolution in the same plane with each other.

In testimony whereof I have affixed my signature.

LEON B. STRONG.